Nov. 7, 1950 S. H. KATZ 2,528,522
METHOD OF PRODUCING AND RECOVERING FINE CARBON SMOKE
PARTICLES AND APPARATUS THEREFOR
Filed Oct. 23, 1944 3 Sheets-Sheet 1

INVENTOR.
SIDNEY H. KATZ
BY Millard F. Peake, Jr.
ATTORNEY.

INVENTOR.
SIDNEY H. KATZ

Patented Nov. 7, 1950

2,528,522

UNITED STATES PATENT OFFICE 2,528,522

METHOD OF PRODUCING AND RECOVERING FINE CARBON SMOKE PARTICLES AND APPARATUS THEREFOR

Sidney H. Katz, Edgewood Arsenal, Md.

Application October 23, 1934, Serial No. 749,565

2 Claims. (Cl. 23—209.8)

(Granted under the act of March 3, 1883, as amended April 30, 1928; 370 O. G. 757)

The invention described herein may be manufactured and used by or for the Government for governmental purposes, without the payment to him of any royalty thereon.

This invention relates to a method and apparatus for treating reaction products, and more particularly to a treatment wherein the reaction products are quickly cooled or heated as desired and the accumulation of precipitates and distillates on the walls of the reaction chamber is prevented.

In many reactions, heat is generated in the apparatus and the reaction products may not be used at once due to their high temperature. Furthermore in some cases products of the reaction such as precipitates or distillates collect on the walls of the reaction apparatus and injuriously affect the desired products. Such distillates or precipitates sometimes accumulate until they break loose and then mix with the reaction products to excessively dilute or concentrate the products or otherwise contaminate them. Also in some reactions, strongly corrosive products may injure the walls of the reaction chamber unless quickly removed.

One object of this invention is to provide a method and apparatus for raising or lowering the temperature of reaction products while in the reaction chamber.

Another object of this invention is to provide a method and apparatus for preventing the deposition of distillates or precipitates on the walls of a reaction chamber.

Another object of this invention is to provide a method and apparatus for obtaining fine carbon smoke particles suitable for use in gas mask filters.

It has long been known that the efficiency of filter material used in canisters for gas masks for removing smoke and gas particles from air is increased when the material is impregnated with finely divided solid material including carbon. However, the carbon must not collect entirely on the outer surface of the filter material since this causes too great resistance to air flow through the material, thus making it less suitable for use in gas mask canisters. Difficulty has heretofore been encountered in obtaining a sufficiently fine even grade of carbon smoke particles which can be drawn into the interstices of the filter material, such as filter paper, and will adhere to the fibers of the paper without agglomeration in large size particles.

Another object of this invention is to provide a method and apparatus for the continuous production of fine carbon smoke and for cooling the smoke at once so that it may be passed directly to an impregnating machine and impregnated in the interstices of filter material without damage of the filter material by heat.

Another object of this invention is to provide a generator for continuously producing fine carbon smoke in which the smoke particles are prevented from collecting on the walls of the generator and breaking loose as larger particles, thus assuring an even size of smoke particles issuing from the generator, or reducing the diameter of the smoke channels of the generator by accumulations of carbon.

These and various other objects of this invention will be apparent from the following description and appended claims, with the understanding that the several necessary elements comprising the invention may be varied in construction, proportion and arrangement without departing from the spirit of the invention or exceeding the scope of the appended claims.

In order to make the invention more clearly understood, I have shown in the accompanying drawings the invention applied to a smoke generator, without limiting the improvements in their useful applications to the particular construction which, for the purpose of explanation, has been made the subject of illustration.

Figure 1:
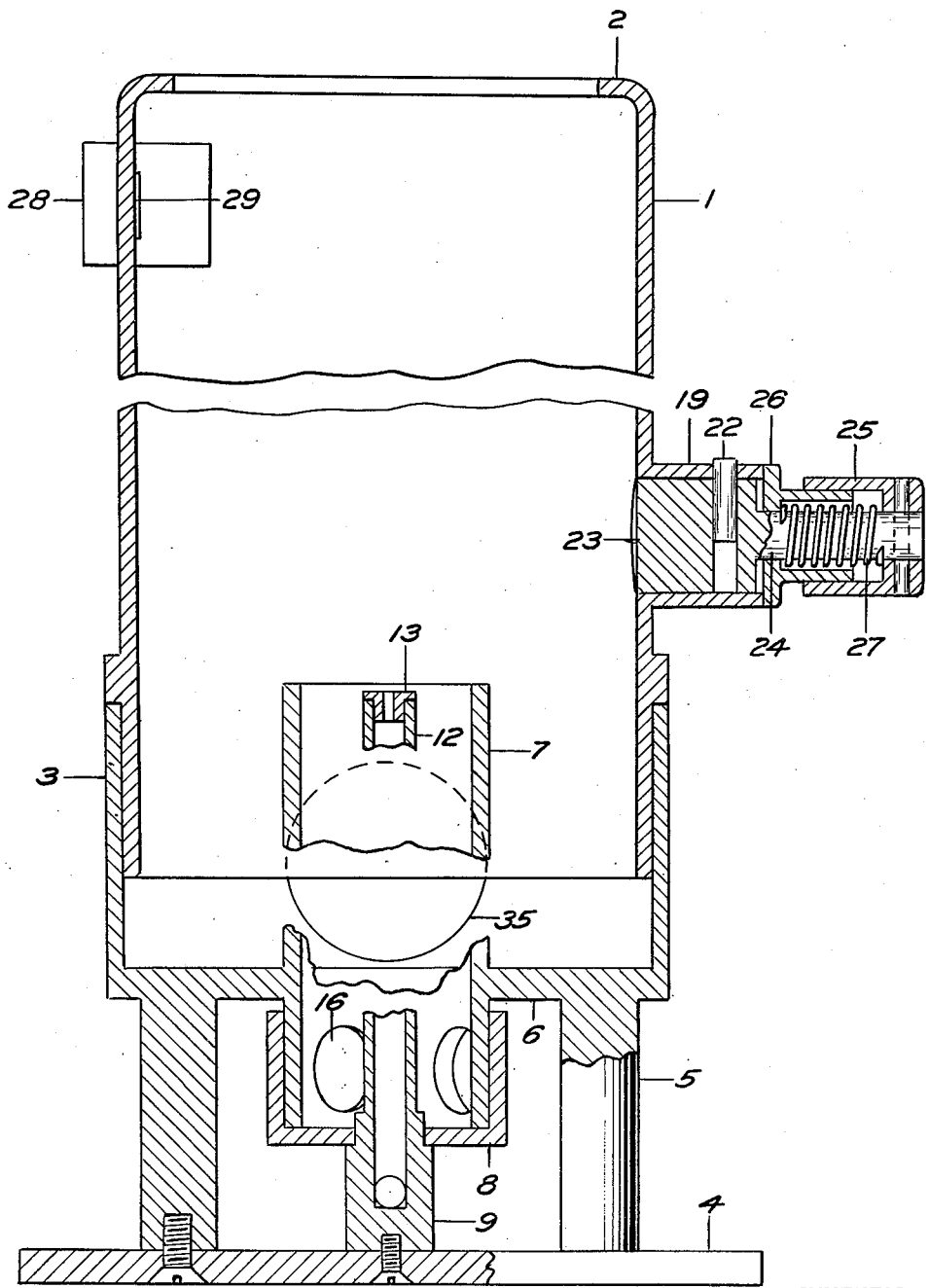
Fig. 1 is an elevation of a smoke generator partly in section.
Figure 2:
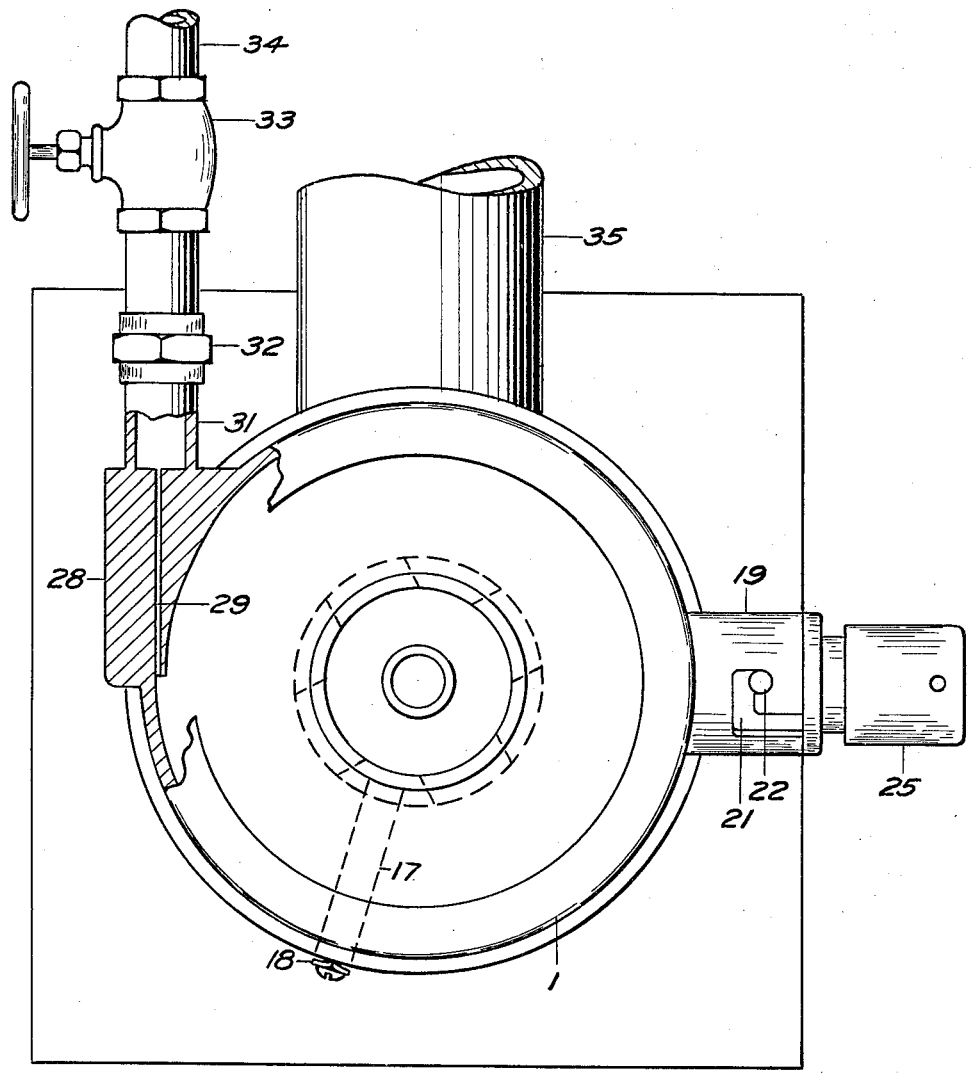
Fig. 2 is a top plan thereof partly in section.
Figure 3:
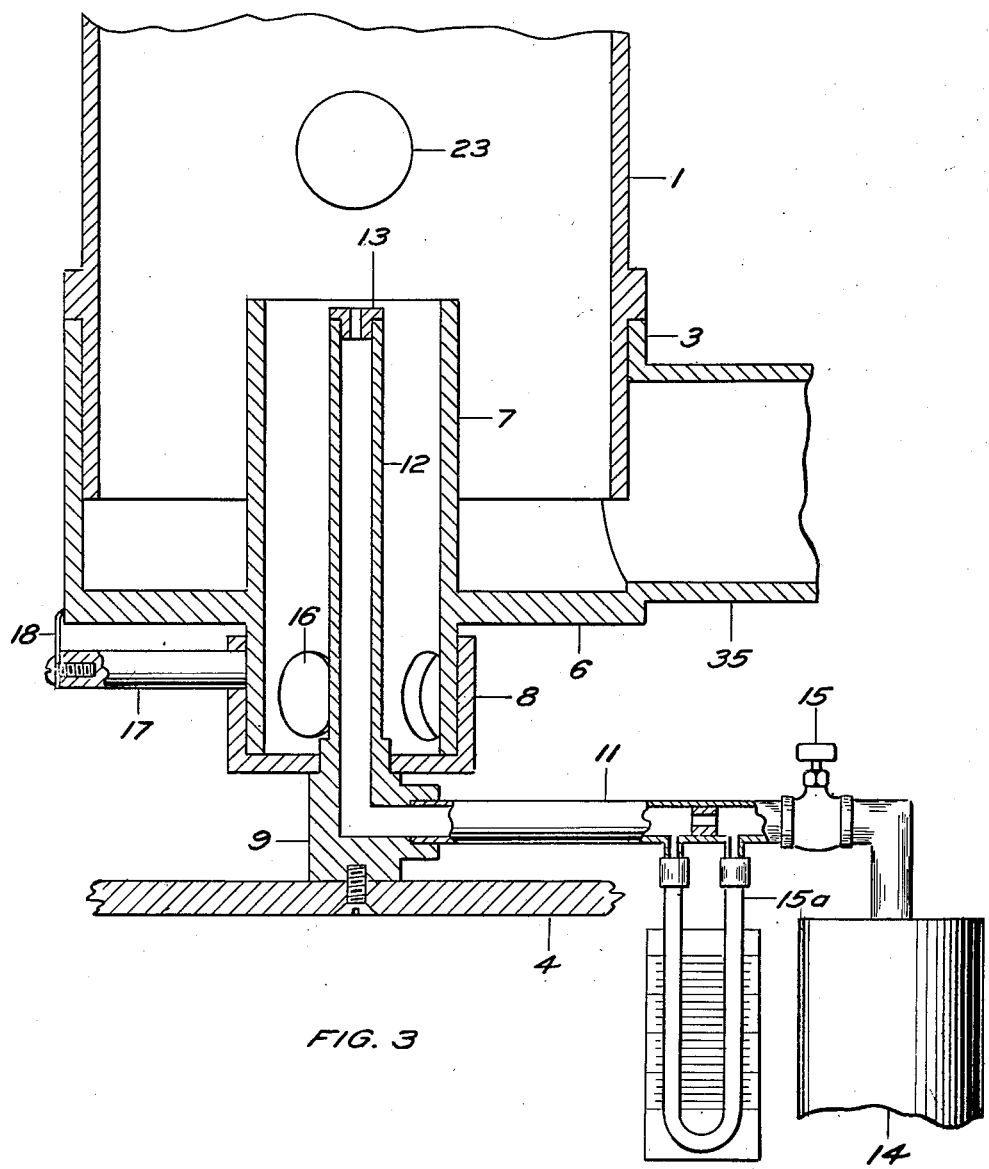
Fig. 3 is a broken elevation of the lower end of the generator.

Briefly this invention embodies a reaction chamber such as a combustion chamber in which the reaction takes place, the inner surface being continuously swept by a current of liquid, preferably water, which may be hot or cold depending upon whether the reaction products are to be heated or cooled.

In the smoke generator chosen to illustrate the invention, the chamber in which the smoke is generated comprises a tubular chimney 1 preferably having an inwardly projecting flange 2 at its upper outlet through which the smoke leaves the generator. The lower end of chimney 1 telescopes into a cylinder 3. The generator is supported upon a base plate 4 carrying a plurality of legs 5 suitably secured to the bottom plate 6 of the generator.

Bottom plate 6 is secured to the lower end of cylinder 3 and has a central opening in which is fixed an air tube 7 extending above and below plate 6. The lower end of tube 7 is closed by a cap 8 which telescopes over tube 7 and is supported for rotation by an inlet nipple 9. Nipple 9 is carried by base 4 and has a threaded side opening to receive supply pipe 11 for transmitting combustible fluid to the burner. Nipple 9 also has an upwardly extending neck portion of smaller diameter to provide a shoulder on which cap 8 rests. A burner tube 12 is carried by nipple 9 and extends upwardly into air tube 7, terminating just below the upper edge of tube 7. A restricted nozzle 13 is preferably mounted in the upper end of burner tube 12.

Combustible fluid is supplied to pipe 11 from any suitable supply. For the production of smoke for use in impregnating filter paper, acetylene has been found desirable and pipe 11 is connected to a tank 14 containing acetylene under pressure, a valve 15 and flowmeter 15A being connected in pipe 11 to adjust the flow to the burner.

The lower end of air tube 7 and cap 8 are provided with openings 16 whereby the supply of air to the burner may be adjusted. For this purpose, the rotatable cap 8 has secured thereto a rod 17 projecting slightly beyond outer cylinder 3. Rod 17 has a pointer 18 on its outer end for cooperation with suitable marks on the outer surface of cylinder 3 to indicate to the operator the quantity of air being admitted to the burner. By rotating rod 17, cap 8 is turned to bring apertures 16 in cap 8 and tube 7 more or less into alignment, thus accurately adjusting the air flow.

The burner may be lighted through an opening in the side wall of tube 1. A short tube 19 projects outwardly around this opening and has a bayonet slot 21 for receiving pin 22 of a plug 23 for closing the opening. Plug 23 has a shank 24 secured to a cap 25 which in turn telescopes over an inner retainer 26, an expansion spring 27 between retainer 26 and cap 25 normally retaining the plug 23 in position. The inner end of plug 23 is curved to follow the contour of the inner surface of tube 1 in order not to interfere with the flow of liquid within the tube.

Adjacent its upper end, tube 1 is provided with an opening over which is secured closure blocks 28 bolted together. The meeting faces of these blocks have a narrow vertical slot 29 which opens into tube 1 at a tangent to the curved inner face of the tube. The inner surface of the inside block 28 is curved to follow the curvature of tube 1.

The slot 29 communicates with an opening in blocks 28 into which is secured a pipe nipple 31 connected by union 32 and valve 33 to a water supply pipe 34. By this arrangement, a vertical sheet of water may enter tube 1 at a tangent to whirl around the inner surface thereof. This water leaves the smoke chamber by pipe 35 which, as seen in Fig. 1, is connected to tube 1 below the upper rim of air tube 7. The entering water is under sufficient pressure to follow the inner wall of the combustion tube and to completely cover the same with a thin wall of water, so that combustion occurs within a hollow shell of water. In this manner a minimum amount of water is used and the water is prevented from splashing onto the burner.

The operation of my improved smoke generator will be clear from the above description. The plug 23 may be removed to light the burner and is then replaced. The quantity of acetylene or other combustible fluid may be regulated by valve 15 and flowmeter 15A and the air may be regulated by movement of cap 8 by rotation of rod 17, the pointer 18 indicating the extent of opening of the air holes. The water control valve 33 is opened to cause the inner surface of the tube 1 to be flushed by a continual stream of water.

The water cools the smoke so that it may be used at once as an impregnant for filter material. The water further serves to prevent the accumulation of smoke particles on the walls of the smoke chamber. If the smoke particles are allowed to collect on the chamber walls, they form larger particles of various sizes which break loose and escape with the smaller particles and/or may obstruct the passage of smoke. This mixture of uneven sized particles is especially objectionable when the smoke is being used as an impregnant for filter material.

Although I prefer to use acetylene as the combustible fluid, it will be understood that the invention is not so limited, since for some purposes various other gases or liquids may be used, such as hydrocarbon gases, distillates or heavy hydrocarbon oils. Furthermore, although I prefer to use water as the cooling medium due to its ready availability, any liquid which will not burn at the temperatures reached in the combustion chamber may be used.

When the apparatus and process herein described are used for the production of fine smoke particles, the individual carbon particles are activated carbon, due to the incomplete combustion of the fluid in a very humid atmosphere.

Although I prefer to use an apparatus wherein the liquid enters the reaction chamber tangentially, it should be understood that the invention is not limited thereto, since other connections may be used, such as a series of openings around the top of the chamber through which the liquid could fall directly down the chamber walls, the only essentials being that the entire inner wall surface is continually flushed during the operation and that the liquid does not react with the reaction products.

The liquid which flushes the walls of the reaction chamber may serve to heat the reaction products instead of cool them, the liquid in that case being hot. In the embodiment of the invention illustrated and described, the water performs the dual purpose of cooling the reaction products and preventing collection of carbon within the chamber. It will be understood that in some reactions either of these purposes may be obtained; that is, some reaction may require temperature control only, while others may require prevention of the collection of condensates or distillates. This invention may be used for either purpose.

The present invention is shown and described in a co-pending application of S. M. Jessop and H. E. Dyer for "Filter Impregnating Machine," Serial No. 57,732, filed January 6, 1936, now Patent No. 2,416,695, issued March 4, 1947.

While I have shown and described the preferred embodiment of this invention, I wish it to be understood that I do not confine myself to the precise details of construction herein set forth by way of illustration, as it is apparent that many changes and variations may be made therein by those skilled in the art without departing from the spirit of the invention or exceeding the scope of the appended claims.

I claim:

1. A method of obtaining finely divided carbon smoke particles for direct impregnation into a filter which comprises burning a combustible fluid with an incomplete supply of air in a chamber, continuously spraying a stream of water tangentially over the inner surface of the chamber such that all of the surface is flushed, and collecting the fine smoke particles emerging from the chamber.

2. A generator for fine smoke wherein contamination by oversized particles is substantially eliminated, comprising, in combination, a burner adapted to burn fuel with incomplete combustion so as to produce fine smoke, an upright circular chimney extending above said burner in which the smoke is adapted to be cooled, and means for tangentially delivering a jet of water adjacent the top of said chimney, said tangential jet of water adhering to the interior surface of said chimney as it travels downwardly in a spiral path from the top thereof so as not to splash into said burner and serving to simultaneously cool said chimney and prevent the deposit of smoke aggregates on the interior surface thereof.

SIDNEY H. KATZ.

REFERENCES CITED

The following references are of record in the file of this patent:

UNITED STATES PATENTS

| Number | Name | Date |
| --- | --- | --- |
| 281,046 | Frasch | July 10, 1883 |
| 969,868 | Herreshoff | Sept. 13, 1910 |
| 1,396,018 | Bradley | Nov. 8, 1921 |
| 1,438,032 | Frost | Dec. 5, 1922 |
| 1,593,514 | Suchy | July 20, 1926 |
| 1,680,625 | Lang | Aug. 14, 1928 |
| 1,700,708 | Pistor et al. | Jan. 29, 1929 |
| 1,725,359 | Lederer | Aug. 20, 1929 |
| 1,828,646 | Dantsizen | Oct. 20, 1931 |
| 1,870,193 | Grahame | Aug. 2, 1932 |